July 6, 1943.   D. M. DAVIS   2,323,380
SCREW MACHINE
Filed Dec. 23, 1941   2 Sheets-Sheet 1
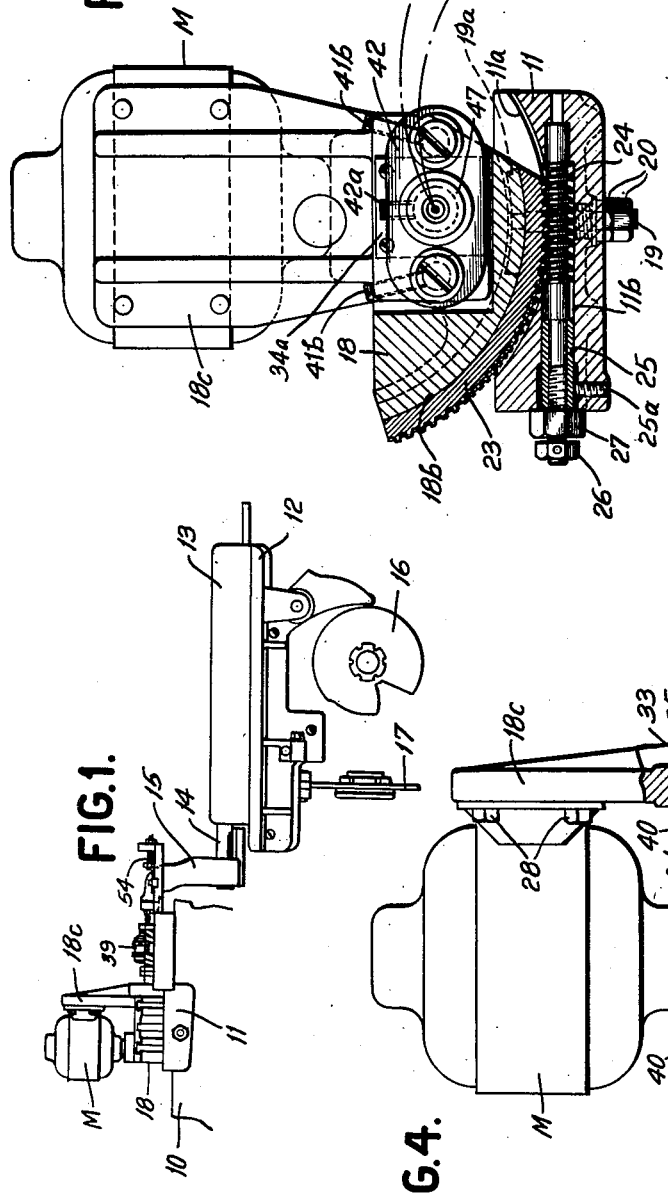
INVENTOR
Durward M. Davis
BY
ATTORNEY July 6, 1943.  D. M. DAVIS  2,323,380
SCREW MACHINE
Filed Dec. 23, 1941  2 Sheets-Sheet 2
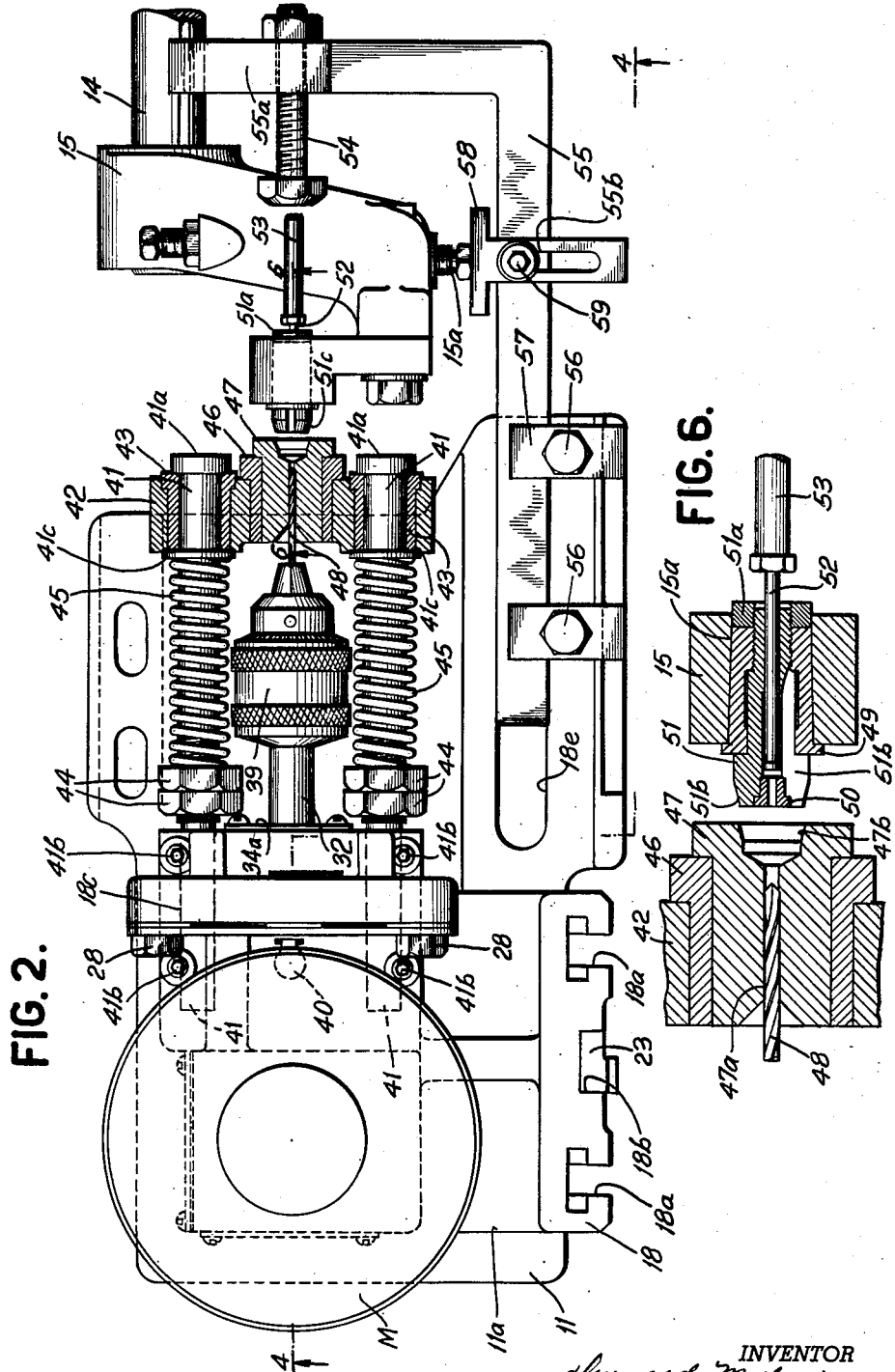
INVENTOR
Durward M. Davis
BY
ATTORNEY Patented July 6, 1943

2,323,380

UNITED STATES PATENT OFFICE 2,323,380

SCREW MACHINE

Durward M. Davis, Vestal, N. Y., assignor to International Business Machines Corporation, New York, N. Y., a corporation of New York Application December 23, 1941, Serial No. 424,181

18 Claims. (Cl. 77—5)

This invention relates to improvements in automatic screw machines.

The primary object of the present invention is to provide an improved counter-boring and burring attachment for an automatic screw machine.

An object is to provide a counter-boring and burring attachment which may be used interchangeably with several different automatic screw machines.

An object is to provide a counter-boring and burring attachment which is particularly well suited for use interchangeably with several different sizes and types of Brown & Sharpe automatic screw machines.

An object is to provide a counter-boring and burring attachment which is very flexible in its adjustment and within practical limits capable of handling a variety of shapes of work pieces.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a diagrammatic view in front elevation showing the present invention attached to a Brown & Sharpe automatic screw machine.

Fig. 2 is a large scale plan view, partly in section, of the present invention.

Fig. 3 is a vertical section on the line 3—3 in Fig. 4.

Fig. 4 is a vertical section on the line 4—4 in Fig. 2.

Fig. 5 is a large scale vertical section showing details of the spindle.

Fig. 6 is a large scale vertical section of the collet for the work-piece and the collet closing bushing.

In Fig. 1 there is shown portions of an automatic screw machine, such as the No. 0, Brown & Sharpe machine in which the reference numeral 10 designates a portion of the main frame of the screw machine located directly in front of the main spindle. On this portion of the frame is mounted the counter-boring attachment. This attachment includes a bed plate or base casting 11 which is attached to the main frame of the screw machine directly in front of the spindle by a suitable bracket (not shown) which is part of the usual equipment of an automatic screw machine and is utilized for supporting various other attachments, such as screw slotting devices, for example. This bracket is not shown in any of the views.

Located on the front of the automatic screw machine and at the right is a support frame 12 (Fig. 1) having a housing 13 which slidably, rotatably receives the usual shaft or push rod 14 carrying the arm 15. This arm 15 is the well known pickup arm which is used in Brown & Sharpe automatic screw machines to pick up work being cut off at the spindle and transport such work to a position to be slotted or otherwise specially treated by a suitable attachment located in front of the main spindle. This pickup arm is moved to the left for the purpose of picking up the work at the spindle, and also for pushing the work against the slotting saw or other cutting tool, by means of a cam 16 driven in a suitable fashion by well known connections inherent to a screw machine.

The shaft 14 is caused to be rotated to carry the free end of the pickup arm into alignment with the spindle or with the work piece cutting device by means of a cam 17 (Fig. 1) which also is driven in a well known way. With the exception of the base 11, which forms part of the present invention, all of the parts so far described are usually found on automatic screw machines in one form or another, particularly in Brown & Sharpe automatic screw machines. Since the operation of these parts and their function is well known in the art, no extended description will be given herein but only a brief mention has been given of them in order to indicate clearly to those skilled in the art how the attachment described herein is coordinated with a conventional automatic screw machine.

The base casting 11, as best shown in Fig. 3, is provided with a generally cylindrical recess 11a, the axis of which is horizontal and parallel with the main spindle and with the line of travel of the shaft 14 carrying the pickup arm 15 when the attachment is properly located on the screw machine. Rotatably slidably supported in this recess 11a and guided by the end walls thereof (Figs. 2, 3 and 4) is a frame casting 18 having a pair of curved T-slots 18a concentric with the axis of the recess 11a.

The casting 18, when adjustably moved in an arc of a circle, is clamped in position by means of T-bolts 19 (Figs. 3 and 4), the heads 19a of which are elongated and curved to fit in the T-slots 18a in casting 18 and the shanks of which project through suitable holes in the base casting 11. The shanks of the T-bolts may be brazed tightly to the curved heads 19a. The T-bolts 19 are provided with lock nuts 20 and washers 21. In order to facilitate the adjustment of the casting 18, springs 22, surrounding the bolts 19 and located in recesses in the casting 11 are provided. These springs press against the washers 21 and maintain the T-bolts moderately tight when the nuts 21 are loosened. This permits movement of the casting 18, but prevents it from wobbling loosely when the nuts 20 are loosened for the purpose of adjusting the casting 18.

For the purpose of adjusting the casting 18 small amounts to center the burring or counterboring tool, the casting 18 is provided with an annular groove 18b which is concentric with the T-slots 18a in which groove is secured a curved rack 23 having a worm thread meshing with a worm 24. This worm is rotatably mounted in a bore 11b (Figs. 3 and 4) in the casting 11 and at its rear, or right hand, end (Fig. 3) is journalled in a reduced part of the bore 11b, while at its front, or left hand, end is rotatable in a bushing 25 pressed into the bore 11b and held in place by a setscrew 25a. The worm 24 is reduced in diameter where it passes through the bushing 25 to form a shoulder abutting against the right hand end of the bushing 25 to prevent withdrawal of the worm when the latter is rotated. The outer or left hand end (Fig. 3) of the worm 24 has pinned thereto a hexagonal nut 26 and is threaded to receive a lock nut 27. By first loosening the nuts 20 for the T-bolts 19 and the lock nut 27, the worm 24 may be turned by means of a suitable wrench applied to the nut 26 to adjustably swing the casting 18 in an arc of a circle.

The casting 18 has an upstanding portion 18c (Figs. 1 to 4) on which is secured the driving motor M for the tool spindle, the motor being attached to the portion 18c by means including suitable bolts 28. The shaft of the motor M extends downwardly through a bushing 29 (Fig. 4) pressed into a vertical bore communicating with a chamber or housing 18d formed in the casting 18 just above the cylindrical portion 11a in the casting 18. Secured to the lower end of the motor shaft is a bevel gear 30 which meshes with a bevel gear 31, secured to the left hand end (Fig. 4) of the shaft 32 forming part of the tool spindle. This shaft 32 is rotatably supported in ball bearings 33 received in suitable cylindrical bores in the casting 18. The housing or chamber 18d may be filled with a suitable lubricating compound, such as grease and for the purpose of inspection of the bevel gears and packing the chamber with grease is provided with a cover plate 34.

The shaft 32 has a long reduced portion where it passes through the holes in the inner ball races of the bearings 33 to form a shoulder which presses against the right hand side of the inner ball race for the right hand bearing 33, with reference to Fig. 4. The inner ball races for the bearings 33 are separated by means of a bushing 35 (see Fig. 5 also) and at the left hand end of the reduced portion, to the left of the left hand bearing 33, there is provided a bushing 36 having a slot registering with a key-way 32a formed in the shaft 32. A key 32b in this key-way, cooperating with a similar key-way in the bevel gear 31, provides the driving connection between said shaft and bevel gear. The extreme left hand end of the shaft 32 has a reduced threaded portion 32c provided with a nut 37 which clamps a washer 38 against the end of the bushing 36. When the nut 37 is screwed tight, the spindle assembly, comprising bevel gear 31, the inner ball races of the bearings 33, and the two bushings 35 and 36, are drawn tight to form a spindle unit which is driven by the motor M through the bevel gear 30. Secured to the right hand end (Figs. 2 and 4) of shaft 32 is a suitable tool chuck which conveniently may consist of the well known "Jacobs" chuck. The housing 18d is provided with suitable lubricating bores receiving oil cups 40 of well known form for the purpose of lubricating the bushing 29 and the bearings 33. The bore for the right hand bearing 33 (Fig. 4) is closed by a cover plate 34a having a hole for shaft 32.

Located on each side of the shaft 32 and secured in parallel horizontal bores in the casting 18 are two guide pins 41 (Figs. 2 and 3). Pins 41 have heads 41a which act as stops for a carrier 42 and are secured in the bores of frame 18 by headless set-screws 41b which engage flats milled in pins 41 to prevent their turning. The carrier 42 is slidably mounted on the pins 41a and for this purpose is bored to receive bushings 43 which are pressed into bores in the carrier.

Near the left hand ends of the pins 41 the latter have reduced threaded portions carrying lock nuts 44. Interposed between the lock nuts 44 and washers 41c abutting the left hand face of the carrier 42 are springs 45 which press the carrier 42 to the right against the heads 41a of the guide pins 41. The carrier 42, between the pins 41, is provided with a bore in which is received a bushing 46 concentric with the axis of the shaft 32. This bushing 46 is designed to receive a collet closing bushing 47 which is shown in Fig. 6 on a large scale. Bushings 47 have a central bore 47a through which passes the cutting tool which, in the drawings, is shown illustratively as comprising an ordinary twist drill designated 48 which has been mounted in the chuck 39 in a well known way.

The pickup arm 15 may be the one usually provided in Brown & Sharpe screw machines which are equipped with the standard Brown & Sharpe screw slotting attachment and at its free end is formed with a tapered bore 15a, as shown in Fig. 6, receiving a suitable collet supporting bushing 49. This bushing is pressed into the bore 15a as is also the bushing 47 in the bore of the bushing 46 and may be knocked out very easily by means of suitable tools.

It will be understood that each work-piece which is made by the machine and picked up by the pickup arm 15 in the well known way will have its own bushing which may only fit that particular part and shaped accordingly. In Fig. 6, such a work-piece is shown and designated 50 and consists of a part such as a simple bushing having a shoulder. This work-piece is frictionally received in the end of the collet 51 supported in the bushing 49. This collet 51 may be constructed in very much the same general way as the collets used in the spindles of an automatic screw machine which hold the screw stock rod. This collet 51 is formed with two shoulders, one of which abuts against the left hand end of the bushing 49 externally of the bushing while the other abuts against a shoulder formed internally of the bushing 49 adjacent a threaded bore at the right hand end of the bushing. The collet is threaded into this bore and provided with a nut 51a by means of which the collet 51 may be secured in the bushing 49. The internal shoulder in the collet 51 is screwed tight against the corresponding shoulder in the bushing 49 and locked by means of the nut 51a but the shoulder at the left hand end of the collet does not tightly press against bushing 49. The collet is provided with three radial slots 51b to form three resilient jaws capable of closing upon the work-piece 50. These jaws are normally open and are shouldered to correspond with the shape of the work-piece, hence there are shoulders in the collet to conform to the sample work-piece 50.

During the operation of the screw machine, while the work-piece 50 is being cut off by the cross-slide tool, the pickup arm 15 is operated in a well known way by the cams 16 and 17 to move in upon the work-piece and push the jaws of the collet 51 thereover to hold the work-piece lightly until it has been cut off by the cross-slide tool. The pickup arm 15 is next partly withdrawn and rotated into the position shown in Figs. 2 and 6. Thereafter, the pickup arm 15 moves to the left with reference to Figs. 2 and 6, bringing a conical chuck closing surface 51c formed in the collet 51 into engagement with a conical bore 47b formed in bushing 47 concentric with the bore 47a. With continued movement of the pickup arm 15 to the left, the bushing 47, the bushing 46, and the carrier 42 are pushed to the left, thereby compressing the springs 45. The compression of the springs causes the jaws of collet 51 to be closed tightly upon the work-piece 50, owing to the coaction between the conical surfaces 51b, 47b, with the result that the work-piece is held tightly against rotation. With further movement of the carrier 42 to the left in consequence of continued movement of the pickup arm 15 under influence of the cam 16 (Fig. 1), the end of the drill 48, guided by bore 47a, engages the end of the work-piece nearest the main spindle to counter-sink the bore or remove the burs therefrom, according to the specifications for the work-piece.

Extending into the collet 51 through a suitable bore formed therein (Fig. 6) is an ejector pin 52 having an adjustable head 53. After the work-piece 50 has been burred, counter-bored, or otherwise machined, the arm 15 is withdrawn in the usual way and moved a greater extent to the right than when the pickup arm retires from the main spindle with the work-piece at the time of cutoff. This additional movement of the pickup arm 15 causes the head 53 of the plunger 52 to engage a stop screw 54. Since this movement also results in disengagement of the collet 51 from the collet closing bushing 47, the plunger 52 will be enabled to push the work-piece 50 out of the collet 51 and the work-piece will fall into the usual chute commonly provided in automatic screw machines directly underneath the point where the screw slotting and other attachments are usually mounted. The work-piece 50 will, of course, fall into the usual work receiving pan in the bed of the automatic screw machine. After withdrawal sufficiently to eject the work-piece 50, the pickup arm will be moved back to the main spindle to repeat the cycle of operations to pick up the next work-piece which is formed and cut off by the screw machine.

The stop screw 54 is supported by a raised lug 55a formed in a bracsket 55 which is slidably mounted in a rectangular groove 18e cut in the top surface of base 18 parallel with shaft 32 and is adjustably secured in such groove by means of cap screws 56 and clamping blocks 57. Screws 56 pass loosely through holes in the blocks 57 and are threaded into tapped holes in the frame 18. For the purpose of guiding the pickup arm 15, the bracket 55 is provided with a combination stop and guide 58 adjustably secured to the bracket 55 by a stud 59, threaded into a hole in the bracket 55. The guide 58 is slidable in a slot 55b cut transversely of the longer arm of bracket 55.

One of the advantages of the device described herein is of simplicity. One of the best known burring and counter-boring attachments for Brown & Sharpe automatic screw machines requires a special pickup arm in place of the standard screw slotting pickup arm which is usually found on automatic screw machines. This special pickup arm has a locking type collet which may be locked in the work gripping position and the screw machine is provided with a collet closing attachment intermediate the main spindle and the spindle of the counter-boring attachment for closing the collet. Thus, with this special form of pickup arm, there are three main working positions of the pickup arm. First, the pickup position at the spindle and cutoff tools; second, the collet closing position; and third, the counter-boring position where the collet boring or burring tool operates. This requires that the two cams, designated 16 and 17 in Fig. 1, for advancing the pickup arm and rotating it respectively, must have a complicated contour because of the three positions required to complete a cycle upon a work-piece. In the case of the attachment described herein, these cams can be relatively simple since the pickup arm 15 merely has to move in to pick up the work-piece, retreat, rotate to the counter-boring position, advance to close the collet and effect the counter-boring or burring operation, retreat to the starting point and then advance slightly to a position to be rotated back to the point where the arm again advances to pick up the work.

Another advantage is that the collets employed to grip the work in the present case are very simple and reliable and no difficulty is experienced with collet closing actions which might be interfered with by accumulation of chips which is the difficulty often experienced with the locking type collets now in use. Since cutting oil is furnished both to the cutoff tools at the main spindle and to the tool at the counter-boring position, the work-piece is kept bathed in oil at all operating positions and there is no likelihood of chips clogging in the collet. This does happen, however, with the forms of pickup arms and locking collets now in use because no provision is made in the collet closing position to flush the work-piece, collet and collet closing device with oil.

A further advantage of the invention disclosed herein is that it is adaptable to several different types and sizes of automatic screw machine. In Fig. 3 the two arcs of a circle designated "A" and "B" represent, respectively, the travel of the collet 51 for the No. 0 and No. 00 Brown & Sharpe automatic screw machines. In this view, the points C and D, respectively, designate the centers of the spindles of these two types of machine, respectively. On account of the greater size of the No. 0 machine, the pickup arm for this machine necessarily must be longer and on account of the larger spindle and frame, the center of the counter-boring tool must necessarily be at a greater distance from the spindle. No change is required in these two machines to attach the counter-boring and burring attachment disclosed herein thereto but the attachment is mounted on the usual bracket which is provided on the frame on the machine for receiving attachment of this nature. By means of the worm 24 and stop 58 the spindle 32 and the work piece 50 may be very easily and accurately centered, no matter to what machine the counter-boring and burring device is attached.

Another important advantage is that the collets are very simple and can be made very cheaply in comparison with the locking type collet which has a certain amount of mechanism to get out of order and readily becomes clogged with chips.

While there has been shown and described and pointed out the fundamental novel features of the invention as applied to a single embodiment, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A screw machine attachment comprising a frame attachable to the frame of a screw machine, a tool rotating spindle mounted in said frame with its axis parallel with the main spindle of the screw machine, a pickup arm, means to operate the pickup arm to grasp a work-piece cut off at the main spindle and transport said work-piece to a working point in alignment with said tool spindle, a work-piece holding collet carried by said pickup arm, means on the first named frame to close said collet upon a movement of the pickup arm to carry said work-piece to said tool preliminary to engagement of the work-piece for the tool, and means operative upon a retraction of the pickup arm to eject the work-piece from the collet.

2. In a screw machine attachment, a frame for attachment to the frame of a screw machine, a tool holding spindle rotatably mounted in said first named frame, means to rotate said spindle, a pickup arm cooperating with the main spindle and having a closeable collet for receiving a work-piece formed and cut off at the main spindle of the screw machine, and a collet closing and tool guiding device mounted on the first named frame and operative upon said collet to close the latter upon a movement of the work-piece toward the tool.

3. A screw machine attachment comprising a frame, a tool holding spindle rotatably mounted in said frame, a driving motor for said spindle mounted on said frame, a carrier slidably mounted in said frame for movement lengthwise of the spindle, a tool guiding bushing on said carrier, said tool guiding bushing having a collet closing surface cooperating with a work-piece supporting collet to close said collet.

4. In an attachment for automatic screw machines, a main frame, a supplemental frame, a tool rotating spindle mounted in the supplemental frame, means to mount said supplemental frame in the first frame for adjustably swinging the center of the tool rotating spindle in an arc of a circle, a pickup arm having a collet brought into alignment with the tool rotating spindle by movement of said arm, said collet having resilient closeable jaws and a collet closing surface; and means on said supplemental frame located concentrically with said spindle for closing said collet when the collet is moved toward the spindle.

5. In a screw machine attachment, a bed plate for attachment to the screw machine, a frame, means to slidably rotatably mount said frame in said bed plate, a tool rotating spindle mounted in said frame with its axis parallel with the main spindle of a screw machine to which the bed plate is attached, said tool spindle being located in said frame so as to swing in an arc of a circle when the frame is slidably rotated in the bed plate; means to adjustably slidably rotate said frame on said bed plate, means to clamp said frame in its adjusted position, a carrier, guide means for the carrier for guiding the carrier parallel with the tool spindle, a removable tool guiding bushing mounted in the carrier concentrically with the spindle, spring means to hold the carrier away from the spindle, a pickup arm; a work-piece holding collet mounted on the pickup arm and movable by said arm into cooperation with said bushing, said collet having jaws resiliently maintained in open position, said collet and said bushing having mated coacting collet closing surfaces operative when the collet is moved toward the bushing to close said collet upon a work-piece located between said jaws.

6. An attachment for screw machines comprising means to rotate a counter-boring tool; a pickup arm and a carrier, both independently movable parallel with the axis of rotation of the counter-boring tool; a collet for supporting a work-piece and a collet closing bushing, one of said elements being carried by the pickup arm and the other by said carrier, said bushing being operative to close said collet upon the work-piece when the two are brought together by movement of the pickup arm parallel with the axis of rotation of the counter-boring tool.

7. In combination with the frame of an automatic screw machine, a tool rotating spindle mounted in said frame with its axis parallel with the main spindle of the screw machine, a carrier movable parallel with the tool rotating spindle, a pickup arm movable parallel with the tool rotating spindle and having a collet receiving socket, a collet in said socket, a collet closing element, means to slidably mount said collet closing element for movement parallel with the tool rotating spindle; resilient means to hold the carrier with the collet closing element in collet closing position, said collet closing element being adapted to guide a tool rotated by said tool holding spindle and operative to close the collet with an initial advancing movement of the pickup arm toward the tool and thereafter operative to hold the collet closed while the tool is operating upon a workpiece in the collet.

8. A screw machine attachment comprising a base plate, a frame slidably, rotatably mounted on said base plate, a tool rotating spindle on said frame, a motor for driving said spindle mounted in said frame, a pair of guides disposed on diametrically opposite sides of said spindle, a carrier mounted on said guides and having an opening therein concentric with a tool carried by said spindle, a tool guiding bushing removably mounted in said opening and having a collet closing surface; resilient means to maintain the carrier in a collet closing position, said means opposing movement of the carrier in a direction parallel with the spindle away from the collect closing position and toward said tool; a pickup arm having a collet receiving socket, a collet in said socket and having jaws provided with collet closing surfaces coacting with the surface on said bushing, a work-piece ejecting member carried by said collet, an adjustable member carried by said base plate, a pickup arm guiding stop mounted in said adjustable member, and an adjustable stop on said adjustable member engageable with said work-piece ejecting member when the pickup arm retreats from engaging the work-piece with said tool and operative to eject the work-piece from said collet.

9. In combination with a pickup arm of an automatic screw machine, a bed plate, a frame slidably rotatably mounted in said bed plate, a spindle having a tool holding chuck disposed parallel with the line of movement of the pickup arm in its advance to pick up a work-piece, said spindle being located on said frame so as to swing in an arc when the frame is slidably rotated; a motor in said frame for driving said spindle, means to clamp said frame in said bed plate, a pair of guide pins located on diametrically opposed sides of said chuck and secured in said frame at a point behind the chuck and having stop portions located in front of the chuck, a carrier having apertures through which said guide pins pass and having a central aperture concentric with the axis of said spindle and located in front of the chuck, springs surrounding said pins and normally holding the carrier against said stop portions with the last named aperture in front of the chuck, a tool guiding bushing in said aperture having a bore designed to guide a tool such as a twist drill or counterbore held by said chuck; and a collet received in the socket in the pickup arm for holding a workpiece and formed with jaws closeable upon said work-piece by engagement of the collet with said tool guiding bushing, said collet being movable by said pickup arm toward said collet closing bushing, said bushing, in consequence of the pressure of said springs, closing said collet upon a work-piece therein prior to the engagement of said work-piece with the tool, said springs maintaining said collet in closed position while the tool is operating upon the work-piece.

10. In combination with the pickup arm of an automatic screw machine, a spindle having a tool holding chuck rotatably mounted with its axis parallel with the line of advance of the pickup arm to pick up a work-piece, a collet carried by said pickup arm and movable by said pickup arm to a position in alignment with a tool carried by said chuck, a carrier disposed between said chuck and said collet, a bushing mounted on said carrier in alignment with said chuck and said collet and having a bore for guiding a tool rotated by said spindle and mounted in said chuck, means to support said carrier for movement toward the chuck, means for opposing movement of the carrier toward the chuck and operative to restore said carrier when it has been moved toward the chuck; a work-piece ejecting plunger mounted in said collet on the opposite side of the collet to said bushing and adapted, when the pickup arm retreats from the collet closing position to eject the work-piece; and relatively fixed means engaging said plunger to cause the latter to eject the work-piece when the pickup arm retreats.

11. In combination with the main spindle and the pickup arm of an automatic screw machine, said pickup arm having a collet receiving socket, a tool rotating spindle arranged with its axis parallel with the axis of the main spindle and with the line of travel of the pickup arm to pick up a work-piece at the main spindle, said spindle having a tool holding chuck, said pickup arm being rotatable to carry said collet receiving socket to a position to which said socket is concentric with a tool in said chuck, a pair of guides extending parallel with the tool holding spindle and on opposite sides thereof, a carrier having a tool guiding element disposed concentric of said tool for guiding said tool and located in front of said chuck, said element and said collet having coacting collet closing surfaces operative when the pickup arm is advanced toward the tool carried by said chuck to close said collet upon the work-piece, said element when engaged by the collet being advanced by the movement of the pickup arm to bring the work-piece into coaction with the tool, and resilient means opposing the movement of the carrier toward the collet to maintain the collet in closed position.

12. In combination with the pickup arm and main spindle of an automatic screw machine, a tool rotating spindle disposed with its axis parallel with the main spindle and with the line of advance of the pickup arm to pick up a work-piece at the main spindle and having a tool holding chuck, a collet supported by said pickup arm and having a work-piece ejecting element operable to push a work-piece from the collet; a tool guiding bushing; a tool guiding carrier and means to mount said tool guiding carrier for movement parallel with tool rotating spindle, said tool guiding carrier having a socket for the tool guiding bushing disposed concentrically with a tool in said chuck and located in front of said chuck, said tool guiding bushing having a bore receiving a tool held by said chuck and having a collet closing surface engageable by said collet; means tending to oppose movement of the carrier toward the chuck, stop means to arrest the pickup arm with the collet in alignment with the work guiding bushing, and a relatively fixed stop in alignment with the work-piece ejecting element when the collet is in alignment with the collet closing bushing, said pickup arm being advanceable toward the chuck to engage the collet with the collet closing surface to close the collet and thereafter transport the work piece into engagement with said tool and upon retreat of the pickup arm causing the work-piece ejecting member to engage said relatively fixed stop and upon continued movement of the pickup arm to eject said work-piece from the collet.

13. In combination with the main spindle and the pickup arm of an automatic screw machine, said pickup arm having a collet socket and being movable parallel with the main spindle to pickup a work-piece and movable transversely of the main spindle to transport the work-piece to a working position to be operated upon by a supplemental tool at the spindle side of the work-piece; a tool rotating spindle arranged with its axis of rotation parallel with the main spindle and having a chuck for holding said supplemental tool, said tool rotating spindle being located on the side of the main spindle and facing in the same direction as the main spindle; a collet in said socket and having resilient jaws closeable upon the work-piece, a carrier having a tool guiding bushing facing said chuck in the surrounding said tool to guide the latter and having a collet closing surface coacting with a collet closing surface formed in the collet, means to guide said carrier for movement toward the chuck by engagement of the collet with said bushing, resilient means opposing movement of the carrier for the chuck and operative to restore said carrier to its position in front of the chuck, said collet, when the pickup arm is advanced toward said tool, initially causing closure of the collet on the work-piece by contact with the collet closing surface in said bushing and thereafter upon further advance of the pickup arm causing the work-piece to engage the tool; a relatively fixed guide cooperating with the pick-up arm when in said working position to guide the work-piece held by said collet in alignment with said tool, a work-piece ejecting element carried by said collet, and a relatively fixed stop located in alignment with the workpiece ejecting element when the pickup arm is in said working position and operative upon retreat of the pickup arm from the collet closing position to engage said work-piece ejecting element and operate said element with further retreating movement of the pickup arm.

14. In combination with the spindle and the pickup arm of an automatic screw machine, said pickup arm having a collet receiving socket, said pickup arm being advanceable toward the spindle to pick up the work-piece and move laterally of the spindle to a working position for the work piece to effect a supplemental tool operation upon the work-piece at the spindle side thereof; a counter-boring attachment having a base frame attached to the main frame of the screw machine at the side of the main spindle, a supplemental frame, means to slidably rotatably mount said supplemental frame on said base frame with the axis of rotation of said supplemental frame parallel with the spindle, a tool rotating spindle having a chuck for holding a tool at the working position to operate upon the side of the work-piece facing the spindle at the time of cutoff, means to rotatably mount said tool spindle in said supplemental frame with the axis of rotation parallel with the axis of rotation of the main spindle and with said axis of rotation eccentric of the axis of rotation of the supplemental frame, a stop supporting member adjustably mounted on said base frame for movement parallel with the tool spindle, an adjustable stop mounted in said member and coacting with the pickup arm to hold it with the work-piece in alignment with said tool when the pickup arm is in said working position and to guide said arm in its advance to carry the workpiece into engagement with the tool, a tool guiding element located between said chuck and said collet when the pickup arm is in the working position, and means to movably support said element for movement parallel with the tool spindle and toward the chuck.

15. In combination with a main spindle of a screw machine, means to pick up a work-piece cut off by the screw machine at the main spindle and transport said work-piece to a supplementary working position, said means including a moving member having a collet socket; a collet in said socket, an auxiliary tool holder having a tool toward which said collet is moved at the working position by the pickup means, and means operative during the course of said movement of the work-piece toward said tool to close said collet upon the work-piece.

16. In an automatic screw machine, the combination with a main spindle, a tool holder and a supplementary working tool therein; pickup means for transporting a work-piece cut off at the main spindle into engagement with the supplementary tool, including a collet closeable upon the work-piece; a collet closing element interposed between the supplementary tool and the collet and engageable by the collet in its movement toward said tool; and yielding means to hold said collet closing element in the path of the collet, said yielding means permitting the collet closing element to move with the work-piece and maintaining the collet in closed condition while the work-piece is moving toward the supplementary tool.

17. In combination with a screw machine stock holding spindle, a supplementary tool for operating upon the spindle side of a work-piece cut off at the stock holding spindle, means to drive said supplementary tool; a work-piece transporting device including a closeable collet adapted to receive a work-piece while it is being cut off at the spindle and transport said work piece into engagement with said supplementary tool, said collet being normally open; and a collet closing device located in close proximity to the supplementary tool, and operative to close said collet and to hold said collet closed while the work-piece is moved into engagement with the supplementary tool.

18. In combination with the main spindle of an automatic screw machine, a supplementary tool holding spindle having a tool for operating upon a work-piece after it has been cut off at the main spindle, means to drive said tool spindle; means to pick up a work-piece while it is being cut off at the main spindle and transport said work-piece to a position to subsequently move into engagement with the supplementary tool, said transporting means moving said work-piece from said position in a straight path into engagement with said supplementary tool, said transporting means including a normally opened collet closeable upon the work-piece; and means operative while the transporting means is moving said work-piece in said path into engagement with said tool to close said collet and maintain said collet in closed condition while said tool is operating upon said work-piece.

DURWARD M. DAVIS.